United States Patent

McAlea et al.

[11] Patent Number: 5,817,206
[45] Date of Patent: Oct. 6, 1998

[54] SELECTIVE LASER SINTERING OF POLYMER POWDER OF CONTROLLED PARTICLE SIZE DISTRIBUTION

[75] Inventors: Kevin P. McAlea; Paul F. Forderhase, both of Austin; Richard B. Booth, Pflugerville, all of Tex.

[73] Assignee: DTM Corporation, Austin, Tex.

[21] Appl. No.: 597,805

[22] Filed: Feb. 7, 1996

[51] Int. Cl.⁶ .............................. B27N 3/00; B32B 31/00
[52] U.S. Cl. .................................. 156/272.8; 156/308.2; 156/308.4; 264/497
[58] Field of Search ............................ 156/272.8, 308.4; 156/308.2; 264/497

[56] References Cited

U.S. PATENT DOCUMENTS

| | | |
|---|---|---|
| 4,071,653 | 1/1978 | Boessler et al. . |
| 4,247,508 | 1/1981 | Housholder . |
| 4,863,538 | 9/1989 | Deckard . |
| 4,944,817 | 7/1990 | Bourell et al. . |
| 5,017,753 | 5/1991 | Deckard . |
| 5,156,697 | 10/1992 | Bourell et al. . |
| 5,284,695 | 2/1994 | Barlow et al. . |
| 5,304,329 | 4/1994 | Dickens et al. .......................... 264/497 |
| 5,352,405 | 10/1994 | Beaman et al. . |
| 5,385,780 | 1/1995 | Lee ....................................... 264/122 X |
| 5,490,962 | 2/1996 | Cima et al. ....................... 156/272.8 X |
| 5,527,877 | 6/1996 | Dickens et al. ..................... 264/497 X |

FOREIGN PATENT DOCUMENTS

| | | |
|---|---|---|
| 63-260972 | 10/1988 | Japan . |
| 2-133471 | 5/1990 | Japan . |
| WO 94/12340 | 6/1994 | WIPO . |
| WO 96/06881 | 3/1996 | WIPO . |
| WO 96/30195 | 10/1996 | WIPO . |

OTHER PUBLICATIONS

"New Materials DTM introduces TrueForm material for investment casting," *Rapid Prototyping Report*, (1 Dec. 1995).

Ashley, Steven, "Prototyping with advanced tools," *Mechanical Engineering*, (Jun. 1994) vol. 116, No. 6, pp. 48–55.

*Primary Examiner*—Jeff H. Aftergut
*Attorney, Agent, or Firm*—Anderson, Levine & Lintel

[57] ABSTRACT

A powder for use in selective laser sintering, from which prototype articles and masters for molds may be formed, is disclosed. The powder is formed by spray drying a polymer emulsion to yield a distribution of particles of substantially spherical shape. The powder is then air classified to remove excessively small particles from the distribution; the powder may also be screened to remove large particles therefrom, as well. The resulting distribution of particle sizes, by volume, preferably has a mean particle size of between about $20\mu$ and about $50\mu$, with preferably less than about 5% (by volume) of its particles with a size of less than about $15\mu$ and less than about 2% (by volume) of its particles with a size of greater than about $75\mu$. The powder is subjected to selective laser sintering to produce an article of approximately 55% to 75% of theoretical density. The article may be used as a prototype article or part, or as a pattern or master for a mold.

9 Claims, 6 Drawing Sheets

SELECTIVE LASER SINTERING OF POLYMER POWDER OF CONTROLLED PARTICLE SIZE DISTRIBUTION

This invention is in the field of rapid prototyping, and is more specifically directed to materials for use in the fabrication of three-dimensional articles and molds by way of selective laser sintering.

BACKGROUND OF THE INVENTION

The field of rapid prototyping of parts has, in recent years, made large improvements in providing high strength, high density, parts for use in the design and pilot production of many useful articles. "Rapid prototyping" generally refers to the manufacture of articles, or molds within which the articles are to be formed, directly from computer-aided-design (CAD) data bases in an automated fashion, as opposed to conventional machining of prototype articles from engineering drawings. As a result, the time required to produce prototype parts and molds from engineering designs has reduced from several weeks, using conventional machinery, to a matter of a few hours.

One example of a rapid prototyping technology is the selective laser sintering process practiced by systems available from DTM Corporation of Austin, Tex. According to this technology, articles are produced in layerwise fashion from a laser-fusible powder that is dispensed one layer at a time. Portions of each layer of powder are fused, or sintered, by the application of laser energy directed in raster scan fashion at those locations of the layer of powder corresponding to the cross-section of the article to be formed in that layer as indicated by a CAD data base. Additional layers of powder are dispensed and selectively fused in similar fashion, with fused portions of adjacent layers fusing to one another to form a three-dimensional article. Detailed description of the selective laser sintering technology may be found in U.S. Pat. Nos. 4,863,538, 5,017,753, 5,076,869, and 4,944,817, all assigned to Board of Regents, The University of Texas System, and in U.S. Pat. No. 4,247,508 assigned to DTM Corporation, all incorporated herein by this reference. The selective laser sintering technology has enabled the direct manufacture of three-dimensional articles of high resolution and dimensional accuracy from a variety of materials including wax, polycarbonate, nylon, other plastics, and composite materials such as polymer coated metals and ceramics. Wax parts may be used in the generation of tooling by way of the well-known "lost wax" process. Examples of composite powder materials are described in U.S. Pat. Nos. 4,944,817, 5,156,697, and in 5,284,695, all assigned to Board of Regents, The University of Texas System, and incorporated herein by this reference.

As suggested hereinabove, rapid prototyping technology in general, and selective laser sintering specifically, may be used to form a prototype article or part directly from various materials, including plastics. Such prototype articles are useful in visually checking computer models and for form fit evaluation; if the articles have sufficient strength, the prototypes may undergo some amount of functional testing and evaluation. In addition, rapid prototyping may be used to form a positive representation (commonly referred to as a pattern or master) of an article that is to be molded, in which case a mold will be formed around the pattern, for use in injection molding, investment casting, and the like. Molds of various types may be formed in this way. For example, ceramic mold shells for investment casting of metals may be formed by surrounding the master with a ceramic material and curing the ceramic at a sufficiently high temperature, during which the master decomposes into an ash. Silicone-based rubber molds may also be formed in a similar manner as "soft" tools, for the molding of limited numbers of plastic parts. In addition, metal mold dies may be formed by spraying metal around the pattern, followed by infiltrating the metal with a binder.

Surface finish and high definition of the article formed by selective laser sintering, while important from an aesthetic standpoint for prototype articles, are especially important concerns when the article is to be used as a pattern or master for the fabrication of a mold. As is rudimentary in the art, any perturbation in the surface of the pattern or master will be transferred to the mold, and will thus appear in the molded end product. Therefore, smooth surface finish and sharply defined features of high fidelity to the design, are of particular importance for situations where rapid prototyping is used to fabricate mold patterns and masters.

Plastic powders are often used in the selective laser sintering process, both in the fabrication of prototype articles and also in the fabrication of patterns or masters for molds. For example, the use of plastics such as polycarbonate, ABS, nylon 11, and acrylic-based copolymers such as Zeneca A369, in connection with selective laser sintering is well known in the art. These powders are typically produced by the grinding of pellets, and as such the powders typically have average particle sizes in a range of from about 50 $\mu$ to about 125 $\mu$. The feature definition and surface finish of articles produced by the selective laser sintering of these conventional powders is relatively limited, however, by these large particle sizes. It has also been observed that the smoothness and regularity of the surface of an article formed by selective laser sintering also depends upon the shape of the powder particles. Particles formed by grinding tend to have irregular shapes, which translate into rough surfaces for the articles made therefrom, even if the ground powder is processed to the smaller end of the distribution (e.g., an average particle size of 50 $\mu$). Because of the large particle size and also the irregular shape of the particles in conventional powders, significant effort and cost is involved in sanding the article surface to the desired smoothness, especially for use as a mold master or pattern.

Accordingly, powders of small particle sizes are desirable for selective laser sintering as such powders allow definition of high resolution edges and result in smooth surfaces of the article. However, if a substantial fraction of the powder is of a particle size that is too small (e.g., less than 15 $\mu$ in diameter), the dispensing of a new layer of powder on top of a previously selectively sintered layer may cause fissures and gashes in the top surfaces of the article, as high interparticle friction among the excessively small particles results in a high in-plane shear force. Furthermore, a powder having a high fraction of excessively small particle sizes will also adversely affect the "rough breakout" process, in which the article is removed from its surrounding powder after completion of the selective laser sintering process. In addition, it is very difficult and costly to grind polymer into a powder of particle sizes below about 100 $\mu$; such particle sizes may only be achieved, at best, through a succession of grinding steps.

Another limitation on the particle size distribution relates to the thermal processing of the powder into the article. As described in the above-incorporated U.S. Pat. No. 5,017,753, it is useful to control the temperature of the unfused and fused powder at the target surface of the selective laser sintering apparatus, to prevent distortion due to curl (layerwise stress development) and growth (unwanted sintering of unscanned powder). In conventional selective laser sintering systems, this control is obtained by heating the powder at the target surface with a radiant heater, and also by drawing temperature controlled gas, such as nitrogen, through the powder bed. It has been observed, however, that despite such control, powders having excessively small particle sizes are particularly susceptible to unwanted sintering resulting from the temperature control of the powder and article formed therein, because smaller particles sinter to one another at a faster rate than do larger particles under the same time and temperature conditions.

By way of further background, the spray drying of emulsions to form a powder is well known in the art. As is conventional, spray drying consists of atomizing or otherwise forming small droplets of an emulsion by way of a rotary spray nozzle. The droplets are sprayed into a heated environment, so that the water in the emulsion evaporates, yielding a powder of the solute that is in substantially solid spherical particles.

By way of still further background, air classification is a known process for deriving a desired distribution of particle sizes of a material. As is conventional in the art, air classification separates particles in a powder by size, through the application of centrifugal force to a mixture of powder and air by way of a cyclone separator. Particles of different sizes are displaced to different distances, with the larger particles (i.e., heavier particles, assuming uniform density) displaced further from the center of the separator apparatus by the turbulent force. One may thus cull particles of different sizes through the use of air classification.

It is an object of the present invention to provide a selective laser sintering powder that minimizes the average powder particle size while avoiding the detrimental effects of excessively small particles.

It is another object of the present invention to provide an article made by the selective laser sintering of such a powder, in which the article is sufficiently porous so as to avoid cracking of the surrounding mold material in fabrication.

Other objects and advantages of the present invention will be apparent to those of ordinary skill in the art having reference to the following specification together with its drawings.

SUMMARY OF THE INVENTION

The invention may be implemented by preparing a fine powder of a polymer that is capable of being readily emulsified and subjecting the powder to selective laser sintering. Examples of polymers suitable for use in such a powder include acrylics and styrene, both homopolymers and copolymers thereof. The powder is produced by spray drying an emulsion to produce particles of substantially spherical shape. The distribution of particle sizes for the spray dried particles is tuned by way of air classifying, resulting in a powder that has a mean particle diameter in a range of approximately 20 microns to approximately 50 microns, with less than approximately 5% of the particles (volume average) of a diameter less than 15 microns. Preferably, the glass transition temperature of the powder is elevated above room temperature, preferably to a range of 30° C. to 100° C., to facilitate rough breakout and surface finishing.

Articles formed by the selective laser sintering of such a powder preferably have a density of between approximately 55% and approximately 75% of theoretical, and as such are well suited for use as patterns for investment casting of metals and as masters for silicone-based rubber molds, despite the relatively high coefficient of thermal expansion of the polymer.

DETAILED DESCRIPTION OF THE PREFERRED EMBODIMENT

Selective Laser Sintering

Figure 1A:
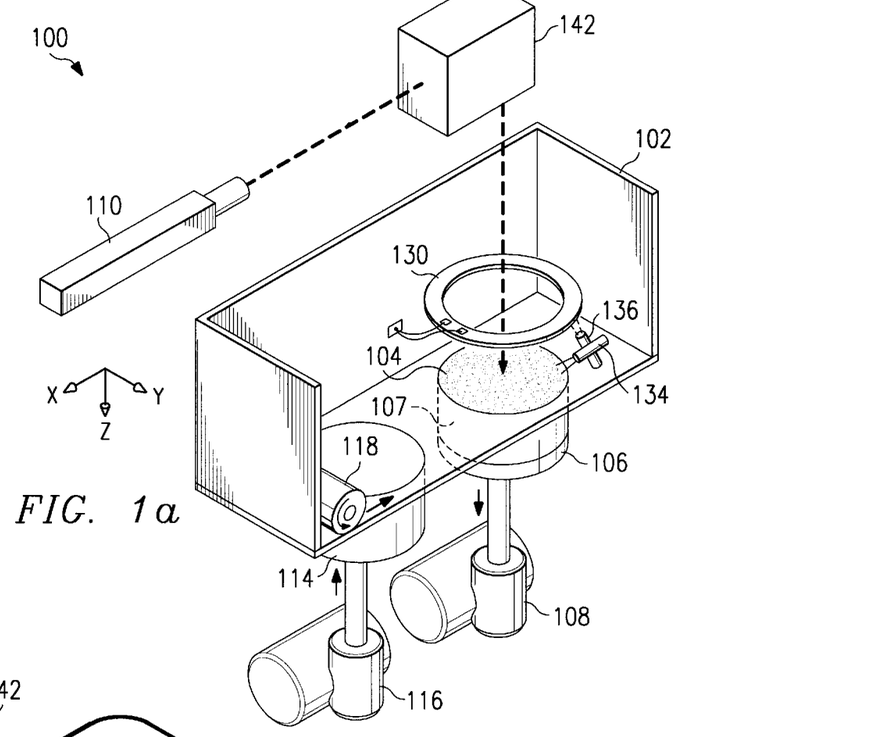
FIGS. 1a and 1b are perspective cutaway and schematic views of a selective laser sintering system for fabricating an article according to the preferred embodiment of the invention.
Figure 1B:
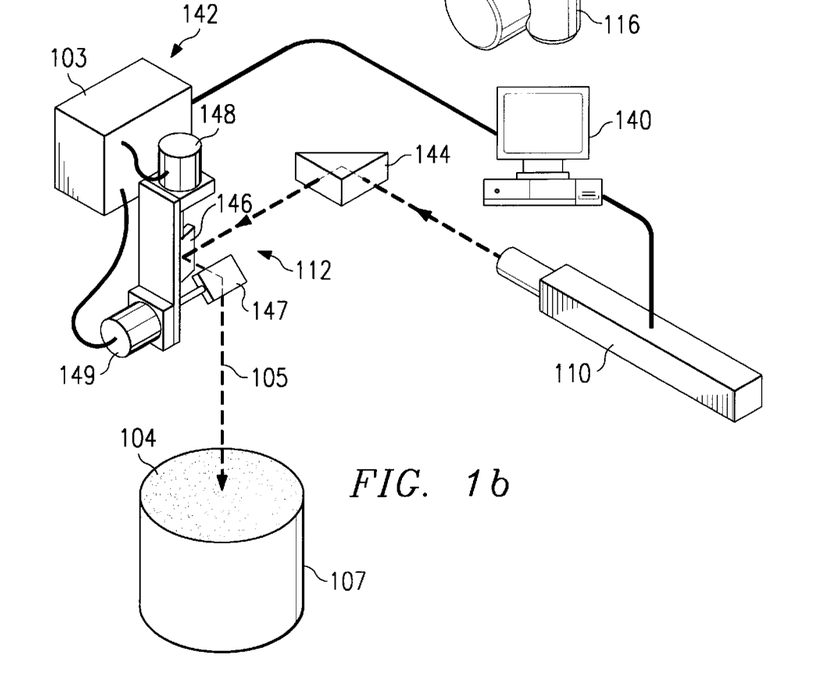

Referring to FIGS. 1a and 1b, the construction and operation of a selective laser sintering system 100 will first be described, for purposes of explanation of the preferred embodiment of the present invention.

As shown in FIG. 1a, selective laser sintering system 100 includes a chamber 102 (front doors and the top of chamber 102 not shown in FIG. 1a, for purposes of clarity) within which selective laser sintering process 10 takes place. Target surface 104, for purposes of the description herein, refers to the top surface of a heat-fusible powder (including portions previously sintered, if present) disposed on part piston 106; the volume of sintered and unsintered powder disposed upon part piston 6 will be referred to herein as part bed 107. The vertical motion of part piston 106 is controlled by motor 108. Laser 110 provides a beam which is directed by scanning system 142 in the manner described in the U.S. Patents referred to hereinabove and as shown in FIG. 1b.

FIG. 1b illustrates laser 110 and scanning system 142. Laser 110 includes, in addition to a laser itself, such conventional control elements as described in the above-referenced U.S. Pat. No. 4,863,538, for example a safety shutter, a front mirror assembly, and focusing elements such as diverging and converging lenses. The type of laser 110 used is, of course, dependent upon many factors and in particular upon the type of powder that is to be sintered. For polymer powders according to this embodiment of the invention as will be described hereinbelow, a Nd/YAG type laser may be used, preferably with a controllable power output. Laser 110 is preferably controllable to be modulated on and off; while on, laser 110 produces laser beam 105 which travels generally along the path shown by the arrows in FIG. 1b.

Computer 140 and scanning system 142 are also included for controlling the direction of the laser beam as it impinges target surface 104. In this preferred embodiment of the invention, computer 140 includes a microprocessor for controlling laser 110 and further includes a CAD/CAM system for generating the data that defines the dimensions of the article being produced. A conventional personal computer workstation, such as a personal computer based on a Pentium-class microprocessor and including floating point capabilities, is suitable for use as computer 140 in the preferred embodiment of the invention.

Scanning system 142 includes prism 144 for redirecting the path of travel of laser beam 105; the number of prisms 144 necessary for directing laser beam 105 to the proper location is based on the physical layout of the apparatus. Alternatively, as is well known in the art, one or more fixed mirrors can be used in place of prism 144 for directing laser beam 105, depending upon the particular layout of system 100. Scanning system 142 further includes a pair of mirrors 146, 147 which are driven by respective galvanometers 148, 149. Galvanometers 148, 149 are coupled to their respective mirrors 146, 147 to selectively orient the mirrors 146, 147 and control the aim of laser beam 105. Galvanometers 148, 149 are mounted perpendicularly to one another so that mirrors 146, 147 are mounted nominally at a right angle relative to one another. A function generator driver in scanning system 142 controls the movement of galvanometers 148, 149 to control the aim of laser beam 105 within target surface 104, in conjunction with its on and off modulation controlled by computer 140, according to CAD/CAM data stored within computer 140 that defines the cross-section of the article to be formed in the layer of powder at target surface 104. It is contemplated, of course, that alternative scanning systems may be used in place of scanning system 142 described hereinabove, including such apparatus as acoustic-optic scanners, rotating polygonal mirrors, and resonant mirror scanners.

Referring back to FIG. 1a, delivery of the fusible powder is accomplished in system 100 by way of powder, or feed, piston 114, controlled by motor 116, in combination with counter-rotating roller 118. As described in U.S. Pat. No. 5,017,753 incorporated hereinabove, counter-rotating roller 118 transfers the powder lifted above the floor of chamber 102 to target surface 104 in a uniform and level fashion. It may be preferred to provide two powder pistons 114 on either side of part piston 106, for purposes of efficient and flexible powder deliver, as used in the SINTERSTATION 2000 system available from DTM Corporation.

It has been observed that control of thermal gradients in the fused and unfused powder at target surface 104 is of importance in reducing distortion in the article being formed. Such distortion may arise from surface tension in the fused portion of the top layer at target surface if cooling is too rapid, which may be caused by the cooling effect of the next layer of powder being applied thereover or by a low ambient temperature in the chamber. Radiant heater 130 is provided in system 100, controlled by thermal sensors 134, 136 as shown in FIG. 1a, to provide such temperature control; in addition or in the alternative thereto, temperature control may be provided by the heated downdraft of gas (e.g., an inert gas such as nitrogen) through part bed 107, as described in the above-incorporated U.S. Pat. No. 5,017,753.

In operation, selective laser sintering process 10 begins by system 100 performing process 12 to dispense a layer of powder over target surface 104. In system 100, powder is delivered by feed piston 114 moving upwardly to place a volume of powder into chamber 102. Roller 118 (preferably provided with a scraper to prevent buildup, such scraper not shown in FIG. 1a for clarity) spreads the powder within chamber 102 and over target surface 104 by its translation from feed piston 114 toward and across target surface 104 at the surface of part bed 107 above part piston 106, in the manner described in the above-incorporated U.S. Pat. No. 5,017,753. At the time that roller 118 is providing powder from feed piston 114, target surface 104 (whether or not a prior layer is disposed thereat) is preferably below the floor of chamber 102 by a small amount, for example 5 mils, to define the thickness of the laser of powder to now be processed. It is preferable, for smooth and thorough distribution of the powder, that the amount of powder provided by feed piston 114 be greater than that which can be accepted by part piston 106, so that some excess powder will result from the motion of roller 118 across target surface 104; this may be accomplished by the raising of feed piston 114 above the floor of chamber 102 by a greater distance that the distance below the floor of chamber 102 that part piston 106 is lowered (e.g., 10 mils versus 5 mils). It is also preferable to slave the counter-rotation of roller 118 to the translation of roller 118 within chamber 102, so that the ratio of rotational speed to translation speed is constant.

Target surface 104 is typically a previously dispensed layer of powder, whether or not portions of the article have been formed therein; alternatively, as will be described in further detail hereinbelow, target surface 104 may be a solid substrate that is in place in part piston 106 and upon which the article will be formed. While a wide range of materials may be used in connection with selective laser sintering system 100, the powder used according to this embodiment of the invention is a polymer powder. After dispensation of a layer of powder, laser beam 105 is then scanned over the layer in raster scan fashion, for example by scanning in the x-direction and incrementally stepping in the y-direction after each scan, to selectively fuse the portion of the powder corresponding to the cross-section of the article to be formed in that layer. Upon completion of the scan of each layer of powder, the next layer of powder is dispensed thereover and the process repeated, often with a differently-shaped cross-section of the article being formed, depending upon the CAD data base representation of the article.

Formation of Powder and Fabrication of an Article

Figure 2:
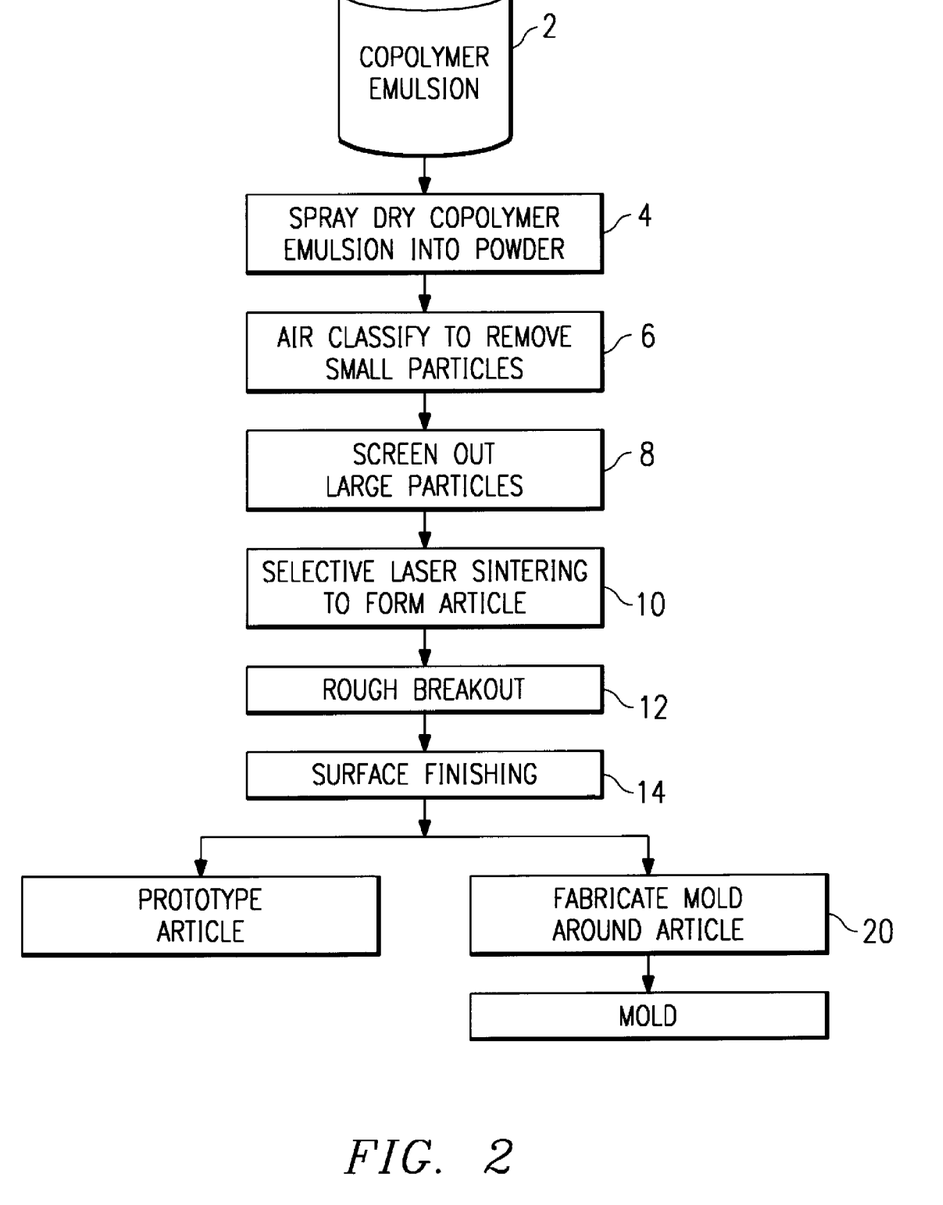
FIG. 2 is a flow chart illustrating the method of fabricating an article or mold according to the preferred embodiment of the invention.

Referring now to FIG. 2, a method of forming a powder and of using the powder so formed in the fabrication of an article according to the preferred embodiment of the invention will be described in detail. As shown in FIG. 2, the method is used in conjunction with a polymer emulsion 2 to form a powder. According to the preferred embodiment of the invention, the polymer of polymer emulsion 2 may be an acrylic or acrylate (e.g., methyl methacrylate, butyl methacrylate), or styrene, either as a homopolymer or as a copolymer thereof, as such materials may be readily placed into an emulsion. As will be described in further detail hereinbelow, the preferred set of polymers used in emulsion 2 preferably have glass transition temperatures that are well above room temperature, preferably in a range of about 30° C. to about 100° C. A preferred example of the polymer emulsion 2 is an acrylic-based copolymer emulsion, such as A639 acrylic copolymer, available from Zeneca, diluted with water to a solids content of between approximately 20 percent and 30 percent.

Figure 3A:
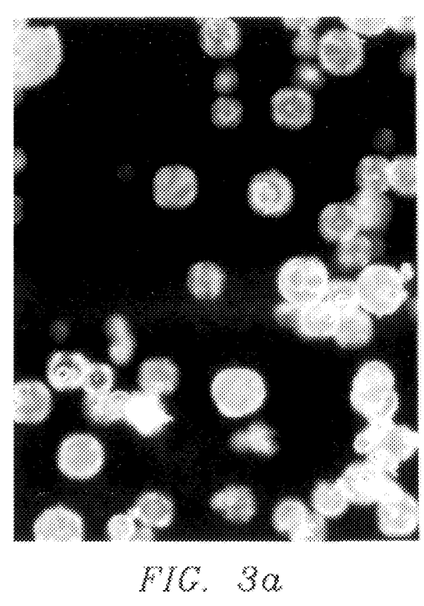
FIGS. 3a and 3b are microphotographs of a powder produced according to the preferred embodiment of the invention, illustrating the substantially spherical shape of the particles therein.
Figure 3B:
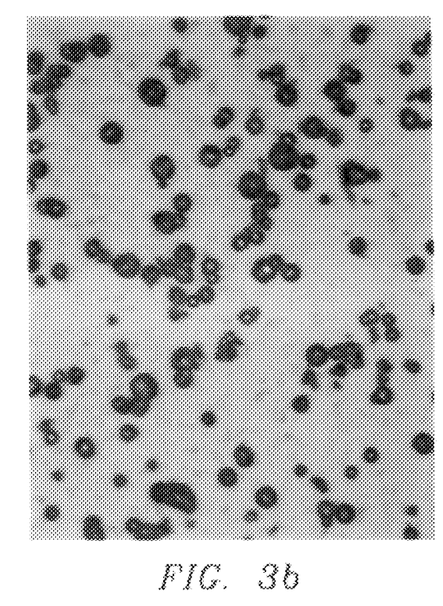

Polymer emulsion 2 is then subjected to spray drying process 4 to form a powder. As is well known in the art, spray drying of emulsions is a conventional technique in the formation of powders. According to the preferred embodiment of the invention, spray drying of polymer emulsion 2 in process 4 is preferred over conventional grinding, because spray drying will yield a powder of substantially spherical particles while the particles produced by the grinding of polymer pellets are quite irregular in shape. FIGS. 3a and 3b are microphotographs of a powder formed by the spray drying of A639 acrylic-based copolymer according to the preferred embodiment of the invention, in which the substantial sphericity of particles in the powder is quite evident. Process 4 is preferably performed so as to provide a mean particle diameter (by volume) of less than about 50 $\mu$, preferably between about 20 $\mu$ and about 50 $\mu$. The distribution of particle sizes, or diameters, about the mean particle size as produced by spray drying is typically a normal distribution.

The small average particle size provided by the spray drying of process 4 according to this embodiment of the invention provides important advantages in selective laser sintering, particularly in achieving excellent feature resolution and definition in the article produced. It has been observed, in connection with the present invention, that articles with sharper edges and smooth surfaces are more readily produced from powders having a small mean particle size.

It has also been observed in connection with the present invention, however, that the presence of extremely fine particles in a selective laser sintering powder may also be detrimental in the selective laser sintering process. The selective laser sintering of powders having a mean particle size of below about 20 $\mu$ have been observed to have a high degree of interparticle friction when used in the selective laser sintering process. This friction is made manifest in excessive plane shear force during the delivery of a layer of powder using roller 118 in system 100 as described hereinabove; fissures and gashes in the top surface of an article being produced have been observed upon the dispensation of a layer of such an ultrafine powder.

In addition, temperature control of part bed 107 the powder is provided by way of a radiant heater, and via a temperature controlled gas, such as nitrogen, through the part bed 107; this temperature control is important in order to minimize thermal gradients between the fused and unfused powder, both previously dispensed and also newly dispensed, as such thermal gradients can result in distortion of the article. Such heating of the unfused powder also reduces the laser power required for fusing the powder. This heating of part bed 107 can cause undesired sintering of unfused powder, causing powder near the article to be sintered thereto, which renders removal of the article from the unfused powder more difficult. Since sintering is a function of time, temperature and particle size, it has been observed that powders of extremely fine particle size are vulnerable to such undesired sintering.

According to the preferred embodiment of the invention, air classification process 6 is performed upon the powder yielded from spray drying process 4 to remove a substantial portion of the extremely fine particles from the polymer powder. Air classification is a conventional process used to separate particles of a powder according to size. According to this preferred embodiment of the invention, air classifying process 6 is performed by mixing the polymer powder from process 4 with air, and forcing the mixture into a conventional air classifying apparatus, such as a VORTEC centrifugal air classifier. As is known in the art, larger particles in the mixture will be forced toward the outside of the air classifier and thus separated from the smaller particles that remain in suspension, since the powder according to this embodiment of the invention is of uniform density (i.e., particle mass varies directly with particle size). Adjustment of the speed (i.e., RPM) of the air classifier may be adjusted to select the particle size threshold of the separation, as is known in the art. According to this preferred embodiment of the invention, air classifying process 6 is performed in such a manner as to remove particles having particle sizes of below about 15 $\mu$ in diameter.

It should be noted that other techniques for separating powder particles of various sizes are known, including screening. The use of screening to perform the separation of process 6 is not preferred according to this embodiment of the invention, however, due to the tendency of fine powders to agglomerate into larger particle assemblies. Any such agglomeration that is present in the powder yielded by spray drying process 4 will be broken up by air classifying process 6 according to this preferred embodiment of the invention.

Figure 4A:
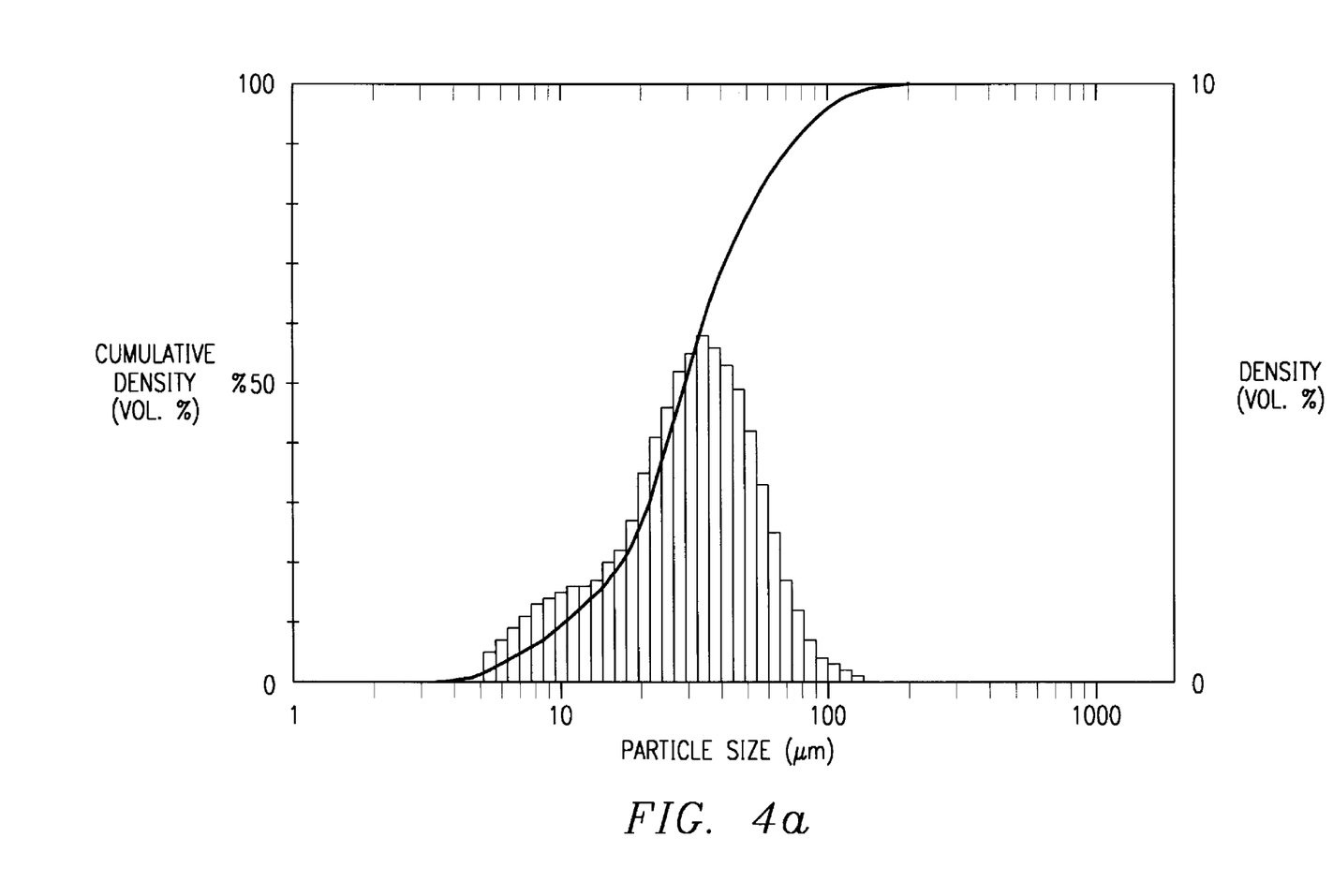
FIGS. 4a and 4b are plots of a particle size distribution for a copolymer powder useful in selective laser sintering according to the preferred embodiment of the invention, at various stages of the powder production process.
Figure 4B:
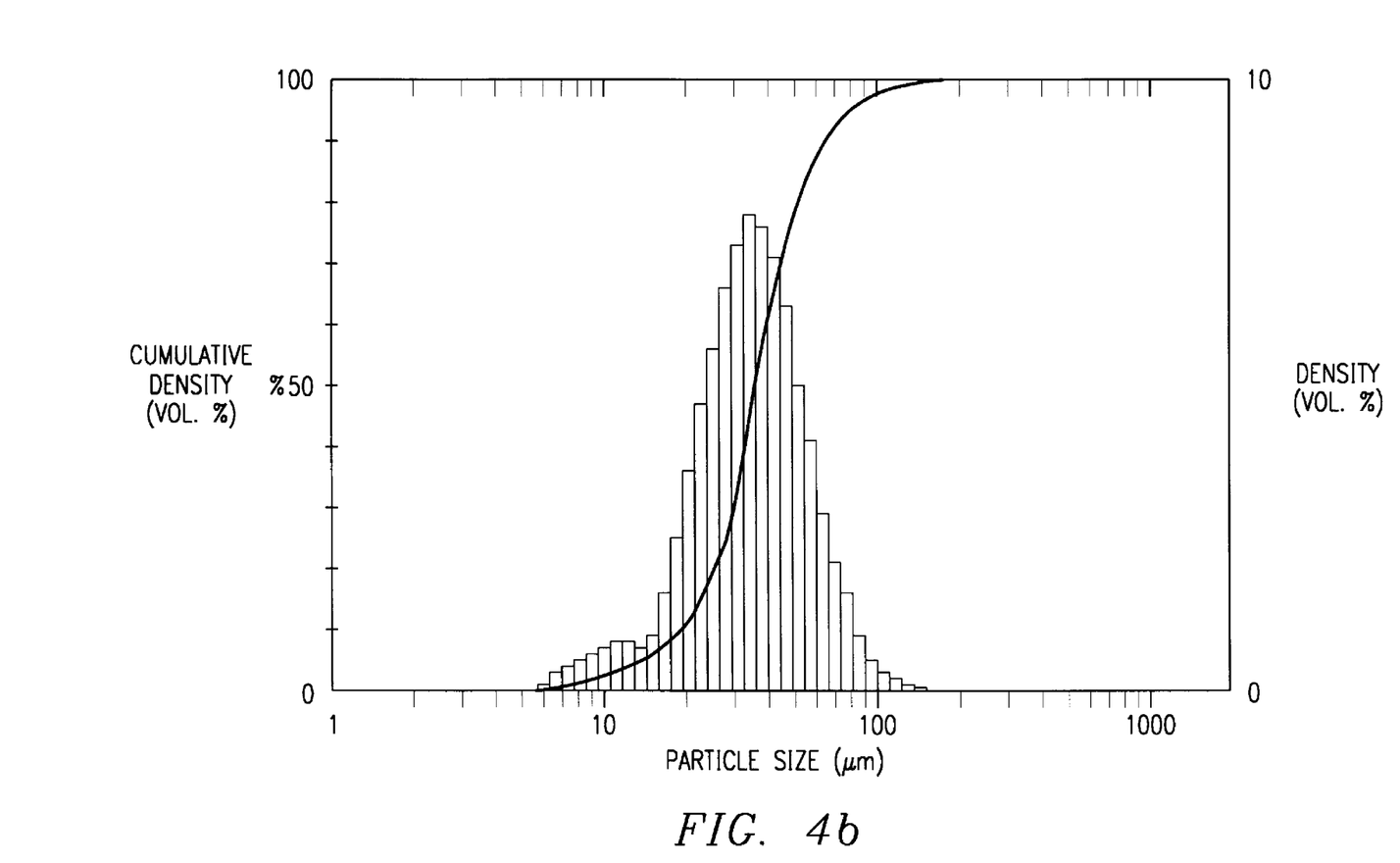

FIGS. 4a and 4b are density and cumulative density plots of the volume distribution of an exemplary powder, to illustrate the effects of air classifying process 6 according to the preferred embodiment of the invention. FIG. 4a illustrates a measured particle size distribution (in volume percent) of a powder of A639 copolymer after spray drying process 4. As illustrated in FIG. 4a for this example, the particle size distribution is approximately a normal, or Gaussian distribution, with some skewing toward the smaller particle size end. The median particle size in this example is approximately 28 $\mu$, and the mean (by volume) particle size is approximately 28.5 $\mu$. Of importance relative to this preferred embodiment of the invention is the volume fraction of the powder made up of particles with diameters of less than 20 $\mu$ which, in the case of the example of FIG. 4a, is approximately 28.6%; approximately 18% of the volume of the powder is made up of particles with diameters of below 15$\mu$.

Referring now to FIG. 4b, the particle size distribution of the powder of FIG. 4a is illustrated after being subjected to air classifying process 6. As is evident from FIG. 4b, the fraction of particles that have diameters of 20 $\mu$ and less are much reduced; in this example, approximately 10% of the powder is now made up of particles with diameters below 20 $\mu$, and only approximately 4% of the powder is made up of particles with diameters below 15 $\mu$. The median particle size in this exemplary powder after air classifying process 6 in this example has increased to approximately 34 $\mu$ (due to the removal of the smaller particles), and the mean (by volume) particle size has increased to approximately 33.9 $\mu$. As such, the air classifying process 6 serves to greatly reduce the number of particles of very small sizes, thus reducing interparticle friction and the deleterious effects arising therefrom.

Referring back to FIG. 2, screening process 8 may now be performed upon the powder following process 6 to remove particles that are above a certain threshold size, for example 75 $\mu$. As noted above, the presence of large particles in the powder undergoing selective laser sintering can result in rough surface texture of the article being produced. According to the preferred embodiment of the invention, screening process 8 is performed after air classifying process 6; this order of processing is preferred, as the very small particles have already been removed from the powder, minimizing agglomeration at the screen. Screening process 8 is performed in the conventional manner, by passing the powder through a mesh having hole sizes corresponding approximately to the threshold limit. Alternatively, removal of large particles may be performed by way of air classifying, in this case discarding the larger particles. In either event, screening process 8 reduces the volume fraction of the powder made up of particles above 75 μ to a low level, for example about two percent. Screening process 8 may not be necessary, of course, if the distribution of particles of excess size is already low after process 6, as in the case of the powder shown in FIG. 4b (approximately 1% of the particles having a size above 75 μ).

The powder after screening process 8 is ready for use in selective laser sintering process 10. Selective laser sintering process 10 in this embodiment of the invention is performed by a selective laser sintering system such as system 100 described hereinabove, and such as the SINTERSTATION 2000 system available from DTM Corporation. As described hereinabove, selective laser sintering process 10 forms a three-dimensional article from the polymer powder produced by processes 4, 6, 8 in layerwise fashion, by the dispensing of a layer of powder over the target surface 104 of part bed 107, followed by the application of laser energy to the powder at locations of the layer selected in a manner corresponding to the cross-section of the article to be formed in that layer. Portions of the fused powder in each layer fuse to previously fused portions in the prior layer, resulting in a three-dimensional article upon the repetition of the steps of dispensing the powder and applying the laser energy.

In carrying out selective laser sintering process 10 according to the preferred embodiment of the invention, sufficient time between each pass of laser beam 105 is preferably provided, so that localized excessive heating does not occur. It has been observed in connection with the present invention that polymer powders of controlled particle size, as described above, may be susceptible to growth (i.e., undesired sintering) and also degradation of the material if heated to excess in the selective laser sintering process. Such overheating may occur if the "time-to-return" of laser beam 105 to a previously scanned portion of the powder is too short. As such, according to the preferred embodiment of the invention, the scanning of the powder by laser beam 105 during selective laser sintering process 10 is preferably controlled so that no location of the powder is overheated. According to the preferred embodiment of the invention, if, in a given layer of powder, a very small cross-section of the article is being formed by itself (i.e., no other parts are being formed in part bed 107 at the same time), dummy portions of the powder outside of the scanned area for the article are fused by the laser in order to increase the time-to-return of the laser at a previously scanned portion. The scanning of such dummy portions, referred to herein as raster bars, will now be described relative to FIG. 5.

Figure 5:
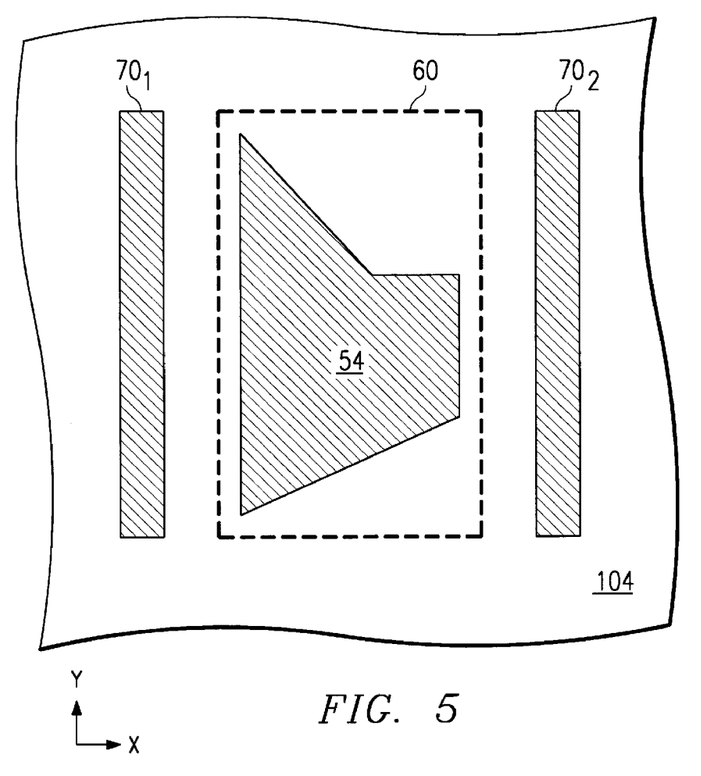
FIG. 5 is a plan view of a target surface in the system of FIGS. 1a and 1b illustrating the use of raster bars in the selective laser sintering process.

FIG. 5 illustrates, in plan view, a layer of powder constituting target surface 104. The presence of raster bars 70 at target surface 104 in one layer of powder. In this example, article 54 is shown as formed in the layer of powder at target surface 104, by a raster scan of laser beam 105 (FIG. 1b) that scans in the x-direction of FIG. 5, incrementing by a small step in the y-direction upon completion of each x-direction scan. Bounding box 60 surrounds article 54 in this layer, and serves as the boundary for the scan of laser beam 105, in the manner described in U.S. Pat. No. 5,352,405, issued Oct. 3, 1994, assigned to DTM Corporation and incorporated herein by this reference. As described in this patent, laser beam 105 is scanned only within the area circumscribed by bounding box 60, and is turned on when aimed at a location corresponding to the cross-section of article 54 in that layer.

According to this embodiment of the invention, however, raster bars 70 are located outside of bounding box 60, extending the y-dimension of article 54 and located a short distance in the x-direction outside of bounding box 60. Raster bars 70₁, 70₂ (collectively, raster bars 70) are locations of the powder at target surface 104 that are fused by laser beam 105 in each x-direction scan, but which do not constitute part of article 54. The solidified raster bars 70 are in fact discarded upon completion of the build cycle. Raster bars 70 serve, however, to force a pause in time between adjacent scans of laser beam 105 across bounding box 60, and thus increase the time-to-return of laser beam 105 thereacross. For relatively small single articles such as article 54, therefore, the problem of excess heating of the fused powder is eliminated by the provision of raster bars 70.

Of course, if multiple articles are being formed in a particular cross-section, or if the size of the article being formed is substantial, the time-to-return of laser beam 105 from one scan to the next will often be sufficiently long (e.g., on the order of several seconds), so that excessive heating will not occur at the location of a prior scan.

As described hereinabove, the layerwise fabrication of the article by selective laser sintering process 10 continues with the dispensation of successive layers of powder, and the application of laser energy to locations of each layer corresponding to the cross-section of the article to be formed therein. If necessary, structures may also be formed in combination with the article to further ensure minimal distortion in its formation. Examples of such structures are illustrated in FIG. 6, which is a cross-sectional elevation view of part bed 107, illustrating the use of bases 62 in the fabrication of an article 56.

Figure 6:
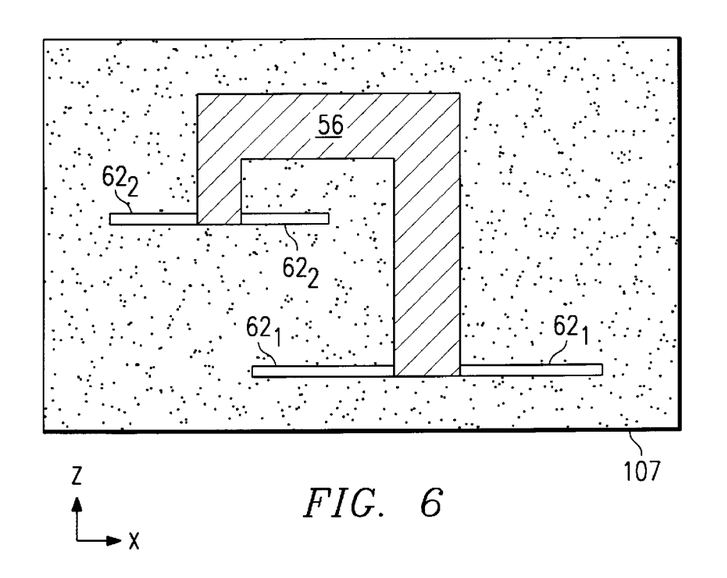
FIG. 6 is a cross-sectional elevation view of the part bed in the system of FIGS. 1a and 1b illustrating the use of bases in the selective laser sintering process.

Bases 62 are not part of the eventual article 56 formed by selective laser sintering in process 10, but are instead thin, or lightly-sintered, powder locations in part bed 107 that help to anchor layers of article 56 to remain flat In the example of FIG. 6, base 62₁ is formed in the bottommost layer of powder at which a portion of article 56 is being formed; the large area of base 62₁ helps to anchor the bottommost layer of article 56, preventing its curling upon cooling and upon dispensation of the next layer of powder. Similarly, base 62₂ is formed at the bottommost layer of an overhanging portion of article 56, also anchoring this layer to prevent its curling. Bases 62 may be thin, or partially-sintered, layers of powder that are formed by laser energy in similar fashion as article 56 except that reduced laser energy may be used in the formation of bases 62.

Referring back to FIG. 2, upon completion of selective laser sintering process 10, the article, surrounded by unsintered powder, is removed from system 100 and subjected to rough break-out process 12. Rough break-out process 12 involves the removal of the unsintered powder from around the article, and is typically performed at a bench location away from system 100 by the manual application of mechanical force. Any bases 62 or raster bars 70 that were formed in process 10 will be removed at this time, as well. It is contemplated that much of the unsintered powder may be recycled and reused in selective laser sintering process 10 in another build cycle, possibly after screening to remove any agglomerated particles therefrom.

Following rough break-out process 12, the yielded article may then be subjected to surface finishing process 14. Typical surface finishing techniques used in process 14 include mechanical sanding with various grit sandpapers and abrasive materials. Surface finishing process 14 is carried out until the desired smoothness and finish is obtained.

As noted above, the powder according to the preferred embodiment of the invention preferably has a glass transition temperature that is well above room temperature, for example in a range of from 30° C. to 100° C. This high glass transition temperature provides a relatively brittle acrylic article, which is more easily sanded and abraded to a very smooth finish than are other plastic materials, especially those with glass transition temperatures around room temperature. The labor required to finish the article is thus much reduced according to the preferred embodiment of the invention.

Following surface finishing process 14, the article is complete. Use of the article will, of course, depend upon the particular article so manufactured. If, for example, the article is itself a prototype part or article, no additional processing may be required.

Alternatively, if the article is a pattern or master for a mold, process 20 will be performed, to form the mold around the article in the conventional way. Molds may be formed in process 20 to fabricate a ceramic mold shell around the article in the conventional manner, in which the shell and article are exposed to sufficiently high temperatures to cause the decomposition of the polymer article. Metal molds may be formed by spraying metal around the article, and then infiltrating the sprayed metal to form a high strength mold, also in the conventional fashion. In addition, process 20 may be used to form silicone-based rubber molds around patterns produced from powders according to the preferred embodiment of the invention.

The use of polymer powders according to the preferred embodiment of the invention also provides important advantages in the formation of molds for investment casting. It has been observed that amorphous polymers, such as the of the powder according to the preferred embodiment of the invention, undergo incomplete melting in the selective laser sintering process. This incomplete melting generally results in articles, formed by selective laser sintering process 10, that are quite porous. For example, articles resulting from the selective laser sintering of this powder have been observed to have a density of from about 55 to 75% of their theoretical value (i.e., of fully dense). Porous articles are especially useful in the fabrication of investment casting molds to prevent cracking of the shell during burn-out of the polymer master that can occur if the coefficient of thermal expansion of the article exceeds that of the ceramic or other conventional materials used to form the mold shell.

Conventional polymer powders, produced by grinding polymer pellets, have been observed to yield porous articles, but with very rough surface textures. According to this embodiment of the invention, however, the spherical powder particles of controlled sizes provide the incomplete melting and porous article noted above, but with very smooth surface finishes and high definition features. These advantages are especially important in the fabrication of investment casting molds, and in the fabrication of silicone-based rubber molds.

If the article produced by selective laser sintering process 10 is to be used as a prototype part itself, after surface finishing step 14, the article may be infiltrated with a polymer, epoxy or other material to improve its structural strength and utility as a prototype part or article.

EXAMPLE

As described above, one example of a powder according to the preferred embodiment of the invention has been formed from an emulsion of A639 acrylic copolymer, available from Zeneca, diluted with water to a solids content of between about 20 percent to about 30 percent. This emulsion was spray dried to a spherical powder having a particle size distribution as shown in FIG. 4a. Air classification of the spray dried powder was perform to reduce the volume percentage of the powder that is made up of particles having diameters below about 15 $\mu$ to between 2 and 5 percent, as shown in FIG. 4b. Screening of the powder reduced the volume fraction the powder that is made up of particles with diameters of greater than 75 $\mu$ to below 2 percent. This powder was subjected to selective laser sintering in a SINTERSTATION 2000 system available from DTM Corporation, with the temperature of the powder in the part bed maintained at between 60° C. and 62° C. Sintering was effected with laser power set to approximately 11 watts, using adjacent laser scans of beam width of 400 $\mu$ and spacing of 0.076 mm (center line to center line), and at a laser beam travel speed of 125 cm/sec during scans.

Tensile strength of the articles formed from this powder was measured to be approximately 6.9 MPa along the x and y axes, and between 0.7 and 5.5 MPa along the z axis (with the z-axis strength depending upon processing conditions such as laser power, scan spacing and the like). After rough breakout, the surface finish of the articles was measured to have an arithmetic average surface roughness (Ra) of on the order of 150 to 350 $\mu$inches; conventional sanding reduced the arithmetic average surface roughness to on the order of 0.8 to 1.5 $\mu$inches.

Articles made by the selective sintering of the A639 acrylic powder according to this example of the invention were successfully used as patterns for producing silicone-based rubber molds and as masters for investment casting mold shells.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

We claim:

1. A method of fabricating a three-dimensional article, comprising the steps of:
   dispensing, at a target surface, a layer of a powder consisting essentially of polymer particles having substantially a spherical shape, and having a mean volume diameter of between about 20 $\mu$ and about 50 $\mu$, wherein less than about 5% of the volume fraction of the powder consists of particles having a diameter of less than about 15$\mu$;
   fusing selected locations of the layer of powder into a mass; and
   repeating the dispensing and fusing steps for a plurality of layers, with fused portions of successive layers fusing to portions of immediately prior layers to form the article.

2. The method of claim 1, wherein the powder has a glass transition temperature of greater than about 30° C. and less than about 100° C.

3. The method of claim 1, wherein the powder is an acrylic-based copolymer selected from a group consisting of homopolymers and copolymers of styrene and acrylics.

4. The method of claim 1, further comprising:

after the repeated dispensing and fusing steps, removing unfused powder from around the article.

5. The method of claim 4, further comprising:

sanding the article.

6. The method of claim 4, further comprising:

after the removing step, infiltrating the article with a binder.

7. The method of claim 1, wherein the article has a density of between about 55% and 75% of full density.

8. The method of claim 1, further comprising:

after the repeated dispensing and fusing steps, removing unfused powder from around the article; and after the removing step, forming a mold around the article.

9. The method of claim 8, wherein the mold is formed of silicone-based rubber.

* * * * *